(12) United States Patent
Myers et al.

(10) Patent No.: US 10,427,687 B2
(45) Date of Patent: Oct. 1, 2019

(54) SPEED RATIO BASED GOVERNOR SELECTION

(71) Applicant: DEERE & COMPANY, Moline, IL (US)

(72) Inventors: David J. Myers, Asbury, IA (US); Kevin W. Campbell, Dubuque, IA (US); Chad Stapes, Dubuque, IA (US); Jason J. Ginder, Waterloo, IA (US)

(73) Assignee: DEERE & COMPANY, Moline, IL (US)

( * ) Notice: Subject to any disclaimer, the term of this patent is extended or adjusted under 35 U.S.C. 154(b) by 63 days.

(21) Appl. No.: 15/725,306

(22) Filed: Oct. 5, 2017

(65) Prior Publication Data

US 2019/0106109 A1   Apr. 11, 2019

(51) Int. Cl.
*B60W 30/188* (2012.01)
*F02D 29/06* (2006.01)
*F02D 31/00* (2006.01)
*B60W 10/06* (2006.01)
*F16H 59/44* (2006.01)
*F16H 59/46* (2006.01)
*F16H 59/08* (2006.01)

(52) U.S. Cl.
CPC .......... *B60W 30/188* (2013.01); *B60W 10/06* (2013.01); *F02D 29/06* (2013.01); *F02D 31/009* (2013.01); *F16H 59/44* (2013.01); *F02D 2250/26* (2013.01); *F16H 2059/084* (2013.01); *F16H 2059/085* (2013.01); *F16H 2059/467* (2013.01)

(58) Field of Classification Search
CPC ..... B60W 30/188; B60W 10/06; F02D 29/06; F02D 31/009; F16H 59/44
See application file for complete search history.

(56) References Cited

U.S. PATENT DOCUMENTS

| 5,386,698 A | * | 2/1995 | Kamel | ................... F02B 37/18 60/603 |
| 7,058,502 B2 | | 6/2006 | Rodgers | |
| 7,258,650 B2 | | 8/2007 | Landes | |
| 8,777,808 B2 | | 7/2014 | Hyodo et al. | |

(Continued)

FOREIGN PATENT DOCUMENTS

JP        2008025497 A        2/2008

*Primary Examiner* — Stacey A Fluhart

(57) ABSTRACT

The present disclosure includes a system for improving the perceived ease of operation in a work vehicle with an internal combustion engine. According to an aspect of the present disclosure, the system comprises a torque converter coupled at one end to the internal combustion engine and is coupled to a transmission at an opposite end via at least a transmission input shaft. The system also comprises at least two governors coupled to the internal combustion engine, wherein the governors are configured to adjust an operating parameter of the internal combustion engine. In addition, the system comprises a vehicle control unit communicatively coupled to the governors wherein the vehicle control unit is configured to receive a first and a second speed signal. This vehicle control unit commands the engine control unit to enable to at least one of the governors when a ratio of the first speed signal to the second speed signal exceeds a first predetermined threshold.

15 Claims, 5 Drawing Sheets

(56) References Cited

U.S. PATENT DOCUMENTS

| | | | | |
|---|---|---|---|---|
| 2004/0014562 A1* | 1/2004 | Kresse | ............... | B60W 10/06 |
| | | | | 477/107 |
| 2004/0102885 A1* | 5/2004 | Genise | ............... | B60W 10/02 |
| | | | | 701/67 |
| 2017/0058806 A1* | 3/2017 | Soller | ............... | F02D 41/123 |
| 2017/0274770 A1* | 9/2017 | Aoki | ............... | F16H 59/18 |

* cited by examiner

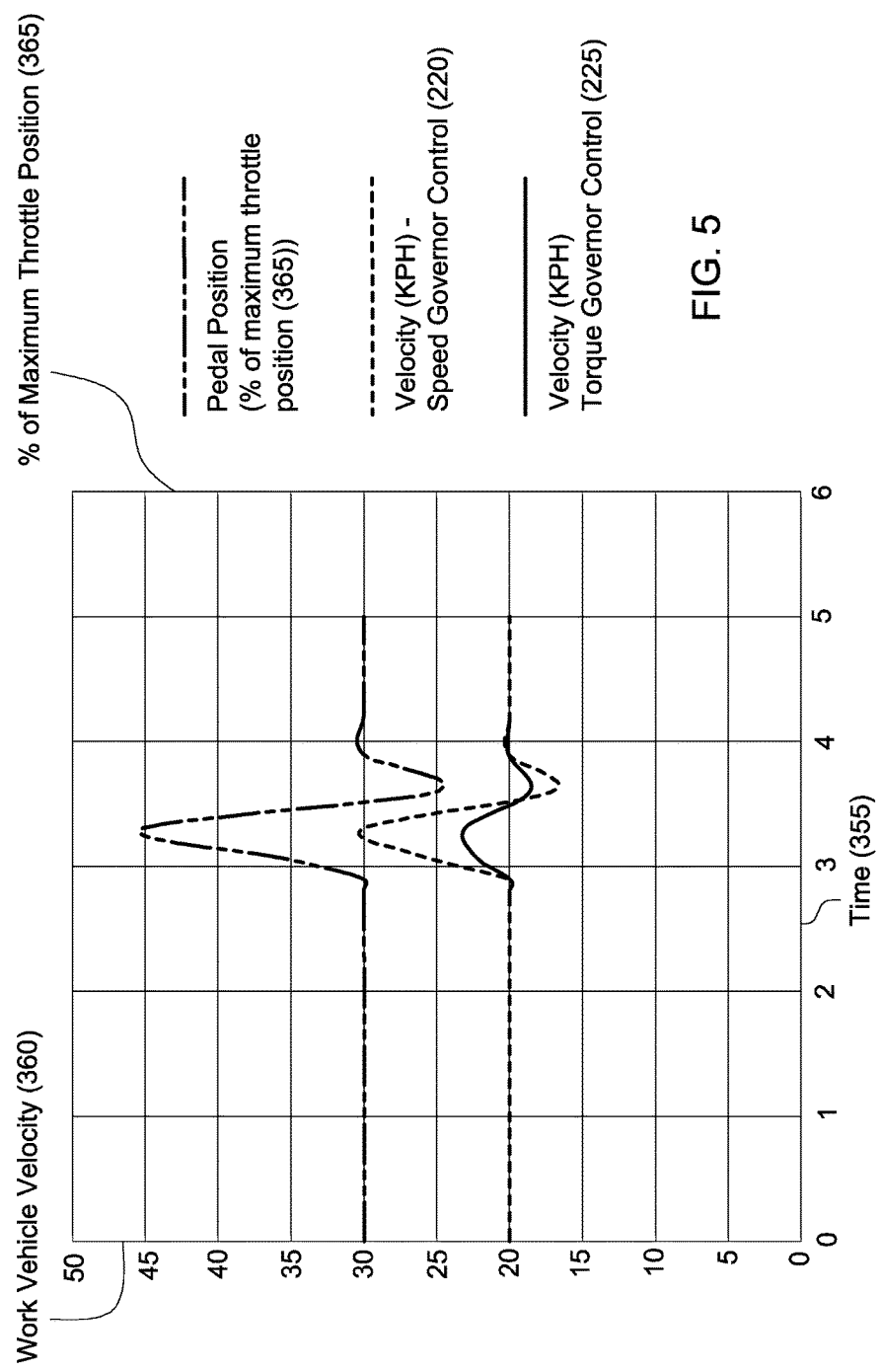

SPEED RATIO BASED GOVERNOR SELECTION

CROSS-REFERENCE TO RELATED APPLICATIONS

N/A

FIELD OF THE DISCLOSURE

The present disclosure relates to the field of governing functions of the engine controller.

BACKGROUND

Internal combustion engines may be operated in several modes including user controlled, torque governed, and all speed governed. User controlled is the most common mode where the user operates a foot pedal to request an amount of torque that the engine will generate. Increasing the requested torque generally causes an increase in the engine speed. User control relies upon the user to adjust the requested torque to account for variations in the loading upon the engine.

In conjunction with the user controlled mode, current efforts utilize gauging the lock up status of a torque converter to automatically determine the use of an appropriate governor. Governors, such as an all speed governor and a torque governor provide different limits on the torque an engine will generate. However, using the approach of choosing the appropriate governor based on lock up status of the torque converter results in a phenomenon in which the vehicle speed suddenly increases after the torque converter is switched from an unconnected state to a connected state. A locked up torque converter is beneficial for a work vehicle where it generally provides better fuel economy during transport of material and more torque or speed when climbing inclines. However, operators typically manually inhibit the torque converter to engage in a lockup mode because it results in an uncomfortable jolt. Turning off the ability for a torque converter to function in a locked up mode results in reduced fuel economy and inefficiencies in the drive.

Therein lies a need for an alternative approach for the governor functions of the engine to eliminate or reduce the sudden jolt factor.

SUMMARY

This summary is provided to introduce a selection of concepts that are further described below in the detailed description and accompanying drawings. This summary is not intended to identify key or essential features of the appended claims, nor is it intended to be used as an aid in determining the scope of the appended claims.

The present disclosure includes a system for improving the perceived ease of operation in a work vehicle with an internal combustion engine.

According to an aspect of the present disclosure, the system comprises a torque converter coupled at one end to the internal combustion engine and is coupled to a transmission at an opposite end via at least a transmission input shaft. The system also comprises at least two governors coupled to the internal combustion engine, wherein the governors are configured to adjust an operating parameter of the internal combustion engine. In addition, the system comprises a vehicle control unit communicatively coupled to the governors wherein the vehicle control unit is configured to receive a first and a second speed signal. This vehicle control unit commands the engine control unit to enable to at least one of the governors when a ratio of the first speed signal to the second speed signal exceeds a first predetermined threshold.

The vehicle control unit may also command the engine control unit to enable at least one of the governors when a rate of change of the ratio of the first speed signal to the second speed signal exceeds a second predetermined threshold. The first and second predetermined thresholds may be a function of transmission gear. The first speed signal is representative of the transmission input shaft speed and the second speed signal is representative of an internal combustion engine speed.

The vehicle control unit may further be communicatively coupled to a boom wherein the vehicle control unit receives a signal representative of a boom speed and inhibits the torque converter from operating in lockup mode when the boom speed signal is above a calculated threshold. The torque converter operates in lockup mode when the torque converter couples the internal combustion engine directly to the transmission and otherwise operates in torque converter mode.

The vehicle control unit may be communicatively coupled to an operator switch wherein the vehicle control unit receives a signal to inhibit the torque converter from operating in a lockup mode when the operator switch is activated, wherein the torque converter operates in the lockup mode when the torque converter couples the engine directly to the transmission and otherwise operates in torque converter mode.

The calculated threshold is a function of the internal combustion engine speed, and increases as the internal combustion engine speed increases.

The two governors may comprise a torque governor operative to control the operating parameter when the torque governor is in an enable state. The operating parameter is the internal combustion torque.

The two governors may further comprise an all speed governor operative to control the operating parameter when the all speed governor is in an enabled state, wherein the operating parameter is the internal combustion engine speed.

In the system, the all speed governor may be disabled when the torque governor is enabled.

According to an aspect of the present disclosure, a method for improving the perceived ease of operation in a work vehicle with an internal combustion engine may include one or more of the following steps: generating a first signal representative of the transmission input shaft speed and generating a second signal representative of the engine speed; transmitting the first and second signal to a vehicle control unit; receiving the first and second signal by the vehicle control unit, analyzing the ratio of the first signal to the second signal by the vehicle control unit; and commanding an engine control unit to enable a torque governor when a ratio of the first signal to the second signal exceeds a first predetermined threshold and when a rate of change of the ratio of the first signal to the second signal exceeds a second predetermined threshold.

The torque governor of the method may be configured to adjust an internal combustion engine torque when the torque governor is in the enabled state. The all speed governor of the method may be configured to adjust an internal combustion engine speed when the all speed governor is in an enabled state.

The method may further include one or more of the following steps: receiving a signal representative of boom speed; and inhibiting a torque converter from operating in lockup mode when the boom speed signal is above a calculated threshold. The calculated threshold may be a function of the engine speed and increase as the engine speed increases.

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The detailed description of the drawings refers to the accompanying figures in which:

FIG. 5 is a graph demonstrating the improved ease of operation of a work vehicle utilizing the system and method disclosed.

Like reference numerals are used to indicate like elements throughout the several figures.

DETAILED DESCRIPTION

The embodiments disclosed in the above drawings and the following detailed description are not intended to be exhaustive or to limit the disclosure to these embodiments. Rather, there are several variations and modifications which may be made without departing from the scope of the present disclosure.

Figure 1:
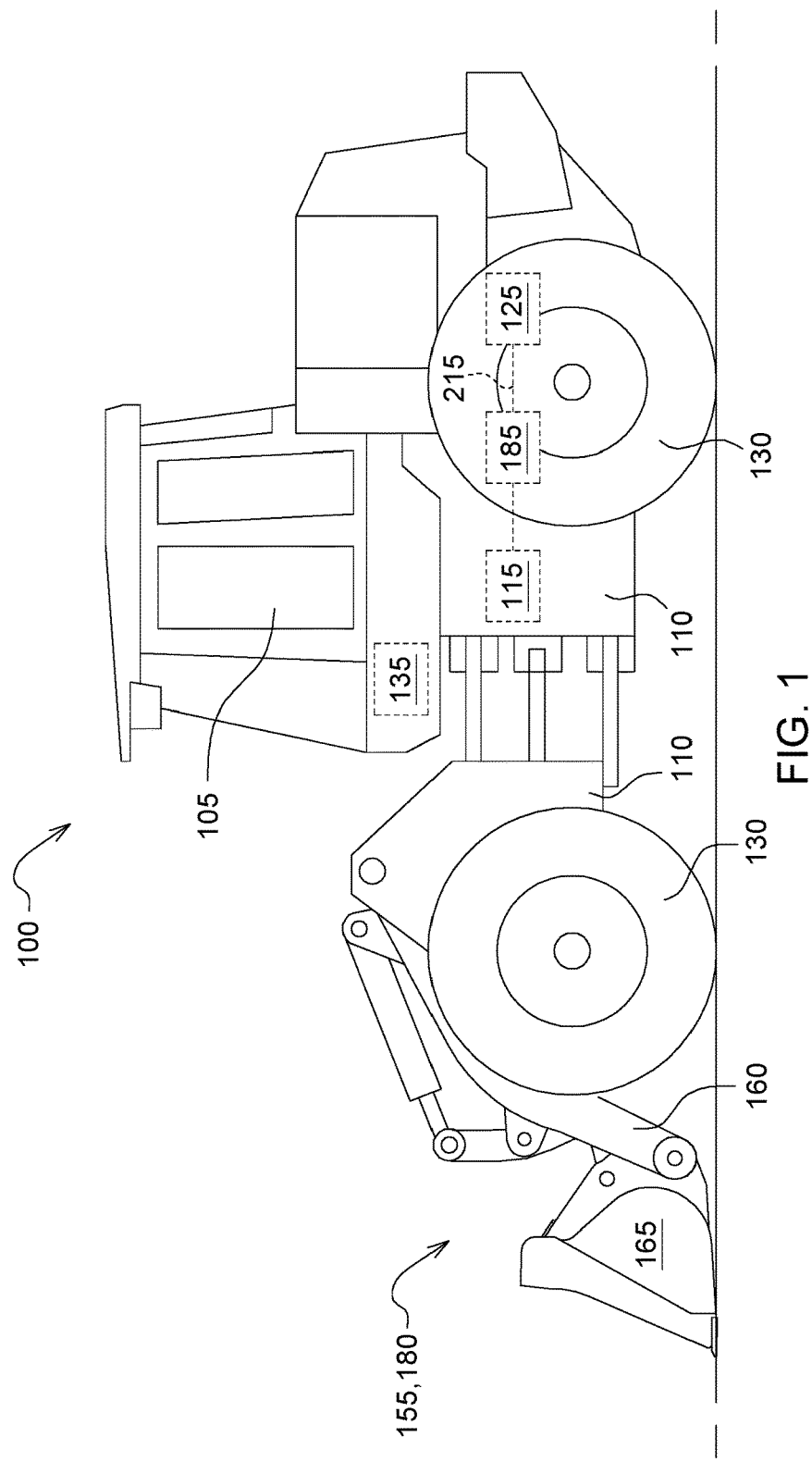
FIG. 1 is a side view of a work vehicle.
Figure 2:
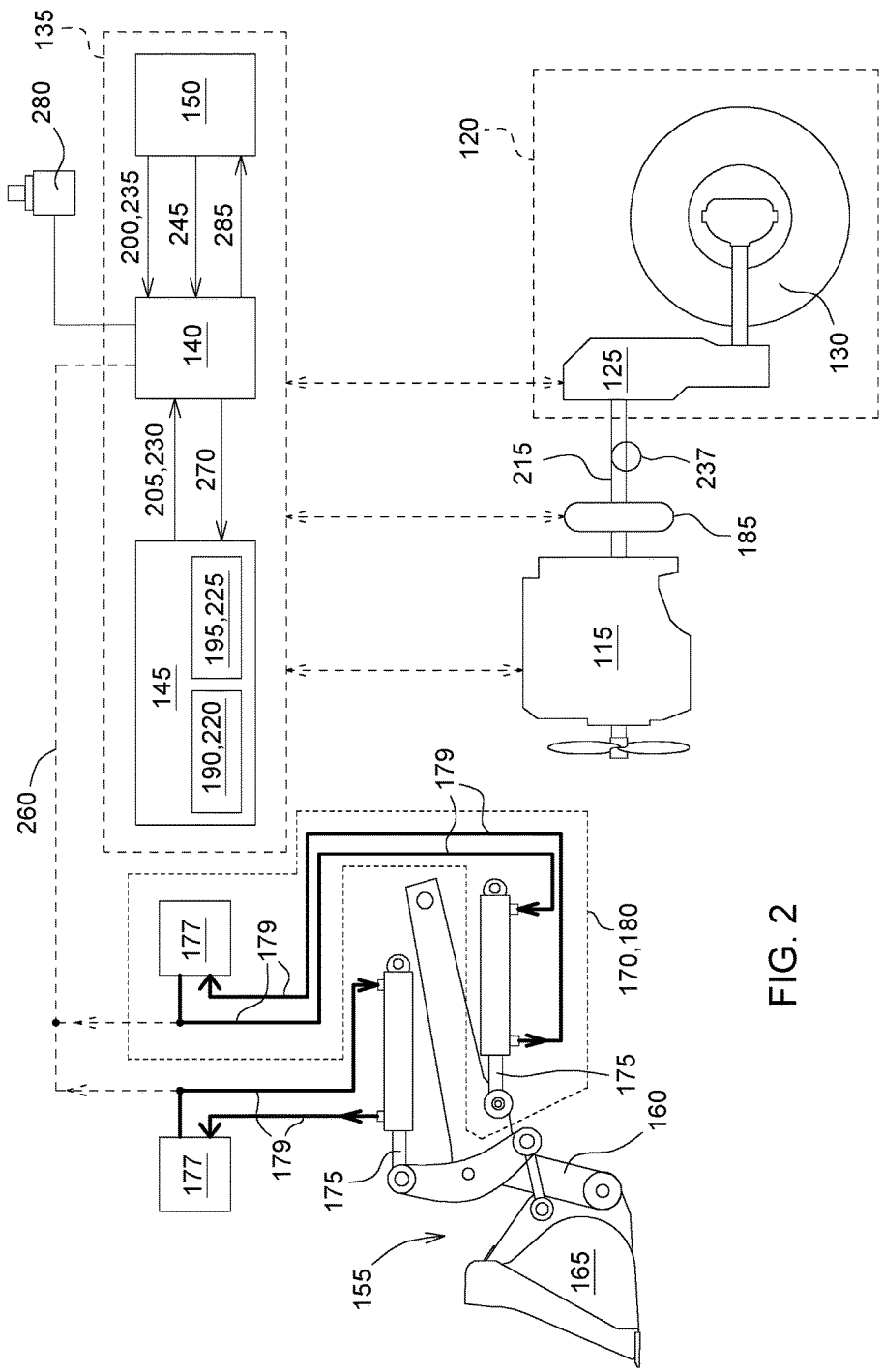
FIG. 2 is a detailed schematic diagram of a system for improving the perceived ease of operation of a work vehicle with an internal combustion engine.

FIG. 1 illustrates a work vehicle 100, such as a loader. An operator controls the functions of the vehicle 100 from an operator's station 105. The loader has a frame 110, and an internal combustion engine 115 that powers the vehicle 100. The internal combustion engine 115 powers a drive unit 120 (shown in FIG. 2) comprising a transmission 125 connected to ground engaging wheels 130 that support and propel the vehicle 100. Although the present invention is illustrated as being used on a loader, it could also be used on any other work vehicles having an internal combustion engine 115. The work vehicle also has a controller 135 comprising a vehicle control unit 140, an engine control unit 145, and a transmission control unit 150 (as shown in FIG. 2). Each unit communicates with their respective vehicle components also outlined in FIG. 2. Engine 115 is in communication with the engine control unit 145. Such communication is represented by a dashed line between engine 115 and the controller 135 comprising the engine control unit 145. Engine control unit 145 is controller which monitors and controls engine 115, including internal combustion engine speed 230 and torque output. The transmission control unit 150 monitors and controls the transmission 125 including the transmission gears (not shown), and transmission lockup enable 285. The vehicle control unit 140 is a controller which monitors and controls a number of components in the vehicle 100. The vehicle control 140 unit may monitor and command the internal combustion engine 115 indirectly through its communication with the engine control unit 145. The vehicle control unit 140 may also monitor and command transmission 125 indirectly through its communication with the transmission control unit 150. The vehicle control unit 140, engine control unit 145, and transmission control unit 150 may be connected through a CAN (controller area network) which enables the three components to exchange information and commands.

Now turning to FIGS. 1 and 2, attached to the front of the vehicle 100 is a loader linkage 155 for performing a variety of excavating and material handling functions. The loader linkage 155 comprises a loader boom 160 and a tool such as a loader bucket 165 or other structure. A boom actuator 170, having a hydraulic cylinder 175 extending between the vehicle frame 110 and the loader boom 160, controllably moves the loader boom 160 relative to the vehicle frame 110. In the illustrated embodiment, the hydraulic cylinders 175 are coupled to a hydraulic circuit 177 that supplies and controls the flow of hydraulic fluid 179 to each hydraulic cylinder 175. This loader linkage 155, referred to hereinafter as a boom 180, places a load on the engine 115 which the vehicle control unit 140 must account for, as discussed further below.

As shown in both FIGS. 1 and 2 a torque converter 185 couples the engine 115 and the transmission 125 to one another. More specifically, the torque converter 185 in the illustrated embodiment includes a fluid coupling (not shown). The torque converter 185 is supplied with lubrication fluid by a lubrication circuit. The lubrication fluid is utilized by the torque converter 185 to transfer power from the engine 115 to the transmission 125. Changing the supply of lubrication fluid to the torque converter 185 thereby changes the magnitude of power that the torque converter 185 is able to transfer.

Now turning to FIG. 2, a schematic diagram of a system for improving the perceived ease of operation of a work vehicle 100 with an internal combustion engine 115 is shown. FIG. 2 represents a system comprising a torque converter 185 coupled at one end to the internal combustion engine 115 and at an opposite end to a transmission 125 via at least a transmission input shaft 215; at least two governors (190, 195) coupled to the internal combustion engine 115, wherein the at least two governors (190, 195) are configured to adjust an operating parameter of the internal combustion engine 115; and a vehicle control unit 140 communicatively coupled to the at least two governors (190, 195) wherein the vehicle control unit 140 is configured to receive a first speed signal 200 and a second speed signal 205, and wherein the vehicle control unit 140 commands the engine control unit 145 to enable at least one of the governors (190, 195) when a ratio of the first speed signal 200 to the second speed signal 205 exceeds a first predetermined threshold 210 (shown in the flowchart of FIG. 3).

In one embodiment, the first speed signal 200 is representative of transmission input shaft speed 235. The transmission input shaft speed 235 may be acquired through a transmission input shaft speed sensor 237. Signals from the transmission input shaft speed sensor 237 are inputted into the vehicle control unit 140. The vehicle control unit 140 calculates the vehicle speed based on the signal representative of the transmission input shaft speed 235. In alternative embodiments, the first speed signal 200 may also be acquired through measuring a signal representative of torque converter output speed, transmission output speed, a wheel speed, a motor speed, a differential output shaft speed, or data acquired from a speed sensor correlated to at least one wheel.

The second speed signal 205 is representative of an internal combustion engine speed 230. In alternative embodiments, the second signal may also be acquired through measurements from a CAM shaft sensor, an optical sensor, a crank shaft sensor, etc. to acquire a signal representative of internal combustion engine speed.

The first predetermined threshold 210 will vary based on a multitude of factors, including the work vehicle model, load imposed on the engine, vehicle speed, gear, boom speed, whether the torque lockup mode is enabled, etc. . . . . .

Figure 3:
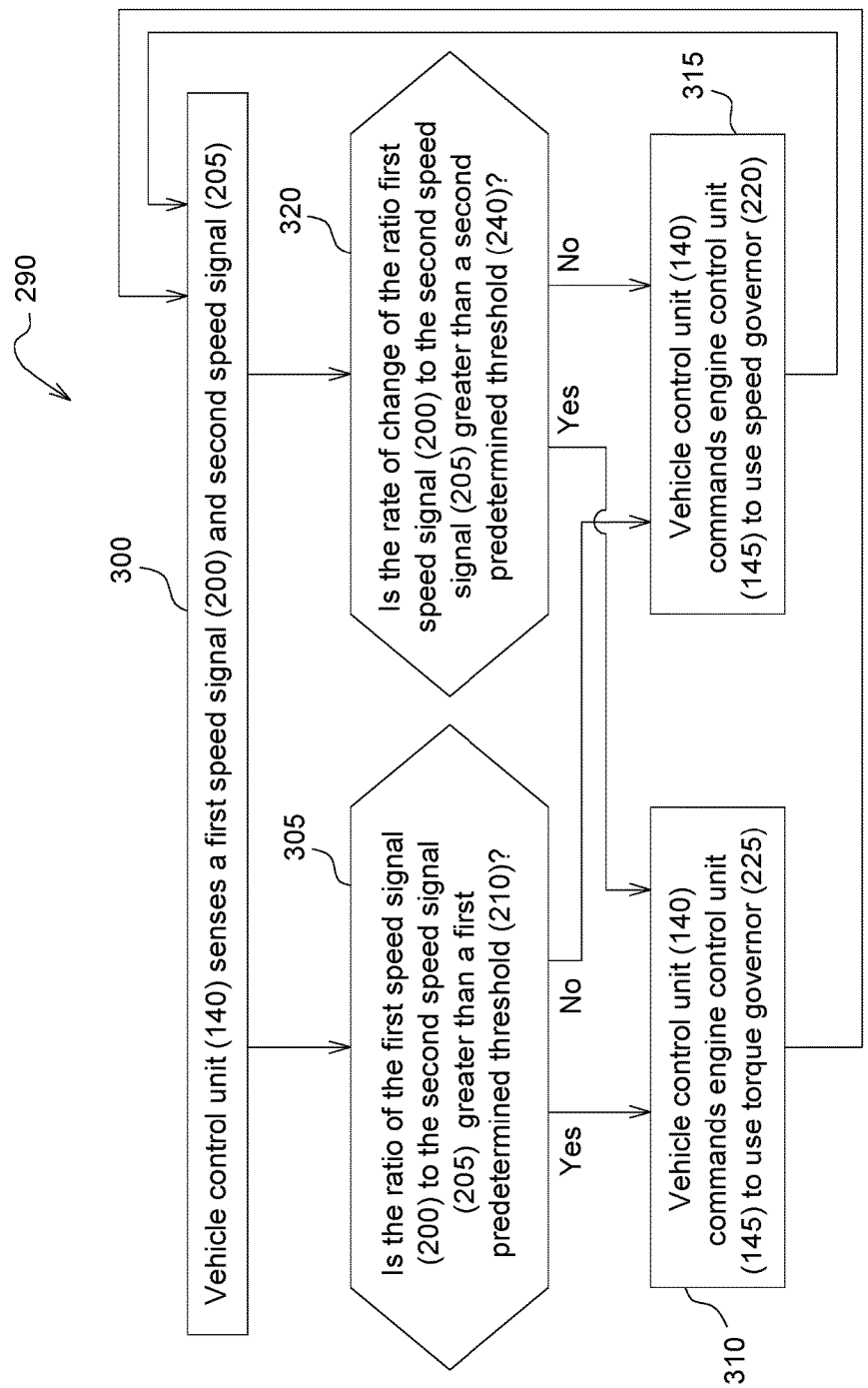
FIG. 3 is a general schematic diagram of a system for improving the perceived ease of operation of a work vehicle with an internal combustion engine.

The at least two governors (190, 195) may comprise at least one of a speed governor 220 and a torque governor 225 (as shown in FIG. 3).

The speed governor 220 is operative to control the operating parameter of the engine 115 when the speed governor 220 is in an enabled state wherein the operating parameter is an internal combustion engine speed 230. Speed governors 220 are used in situations where the speed of the engine 115 must remain a constant despite a changing load condition. A load condition may include transport of materials, variable work vehicle speeds, and variable inclines. Examples of speed governor use include alternating current electrical generators where the frequency of the alternating current is dependent upon the engine speed. In this example, as the load on the generator increases, the torque produced by the engine must increase in order to maintain the constant engine speed, and thus a constant generator output frequency. The desired speed of the engine is controllable through a speed request signal 270 input into the speed governor 220. The term constant as applied to engine speed is loosely held, and is more likely a prescribed engine speed profile followed based on changing load conditions rather a uniform constant speed. In many cases where an engine 115 works through a torque converter 185, the load on an engine varies greatly from time to time and under no-load and light-load conditions, the transmission input shaft 215 or boom 180 to which power from the engine 115 is directed will operate at excessive speeds even though the engine 115 is operated at a substantially constant engine speed under the influence of a speed governor 220. Switching to a torque governor 225 according to the system disclosed above dampens the sudden excessive change in speeds thereby improving the perception of ease of operation for the operator. In a preferred embodiment, the speed governor 220 becomes disabled when the torque governor 225 is enabled. On a similar note, the torque governor 225 is disabled when the speed governor 220 is enabled.

The torque governor 225 is operative to control the operating parameter when the torque governor 225 is in an enabled state wherein the operating parameter is an internal combustion engine torque. Torque governors 225 are often used in conjunction with the user control to limit the amount of torque that the user may request of the engine in the user controlled mode. For example, it is desirable to limit the amount of torque an engine 115 may produce to match the characteristics of an associated transmission. Torque limiting may be a simple maximum limit at all speeds, or vary as a function of the engine speed. Here the idea is to avoid supplying more torque into the transmission 125 or load than the transmission can handle. As the load on the engine increases, the engine speed is allowed to decrease under torque governing to avoid exceeding the maximum torque limit. As the load decreases, the engine speed is allowed to increase, again with the maximum speed and torque limits imposed by the governor.

In one embodiment, the speed governor 220 may be disabled when the torque governor 225 is enabled.

The vehicle control unit 140 may further command the engine control unit 145 to enable at least one of the governors 220, 225 when a rate of change of the ratio of the first speed signal 200 to the second speed signal 205 exceeds a second predetermined threshold 240 (shown in FIG. 3). As shown in the embodiment of FIG. 2, the vehicle control unit 140 may command the engine control unit 145 to enable at least one of the governors (190, 195) when the rate of change of the signal representative of transmission input shaft speed 235 to the signal representative of internal combustion engine speed 230 exceed a second predetermined threshold 240.

The first predetermined threshold 210 and the second predetermined threshold 240 are a function of a transmission gear 245. At higher engine gears where the work vehicle 100 is traveling at high speeds, it is unlikely the work vehicle 100 will encounter a sudden load disturbance, or a sudden load surge on the engine (e.g. from using the implement to move a pile of gravel or running into a pile of gravel). Therefore a need to dampen sudden load surges by enabling the torque governor and disabling the speed governor is not required. In the alternative, at low speeds, the ability to transition from a speed governor to a torque governor is desirable because the work vehicle 100 is more likely to see increased variability in loads on the engine (e.g. from hitting a pile).

The vehicle control unit 140 is further communicatively coupled to a boom 180 wherein the vehicle control unit 140 receives a signal representative of a boom speed 260 and inhibits the torque converter 185 from operating in lockup mode when the boom speed signal 260 is above a calculated threshold 265 (shown in FIGS. 2 and 3). The torque converter 185 operates in lockup mode (not shown) when the torque converter 185 couples the internal combustion engine 115 directly to the transmission 125 and otherwise operates in torque converter mode (not shown). The calculated threshold 265 is a function of the internal combustion engine speed 230, and increases as the internal combustion engine speed 230 increases. At higher engine speeds, it is unlikely a work vehicle 100 will encounter a sudden load disturbance, or a sudden load surge on the engine (e.g. from using the implement to move a pile of gravel or running into a pile of gravel) because at higher engine speeds the work vehicle 100 is either moving from one location to another or traveling uphill. Use of lockup mode at high engine speeds is desired because of efficiency and low likelihood of sudden load surges. In the alternative, at low speeds, lockup mode is undesirable because the work vehicle 100 more likely to see increased variability in loads on the engine (e.g. hitting a pile).

The vehicle control unit 140 may also be communicatively coupled to an operator switch 280 wherein the vehicle control unit 140 receives a signal to inhibit the torque converter 185 from operating in lockup a lockup mode when the operator switch 280 is activated, wherein the torque converter 185 operates in the lockup mode when the torque converter 185 couples the engine 115 directly to the transmission 125 and otherwise operates in torque converter mode.

FIG. 3 is a flowchart illustrating the control system 290 for improving the perceived ease of operation of a work vehicle 100. The control system 290 may be stored in the memory of, and may be executed on a microprocessor within, controller 135. The controller 135, may further comprise of a vehicle control unit 140, an engine control unit 145, and a transmission control unit 150. In step 300, the vehicle control unit 140 senses a first speed signal 200. The first speed signal 200 may be a signal indicative of transmission input shaft speed 235 from a transmission input shaft speed sensor 237. In step 300, the vehicle control unit 140 also senses a second speed signal 205 indicative of internal combustion engine speed 230. The vehicle control unit 140 may process this signal, including by converting it to a particular set of units, adjusting it with offsets, or filtering it.

In step 305, the vehicle control unit calculates the ratio of the first speed signal 200 to the second speed signal 205. If the ratio is greater than a first predetermined threshold 210, step 310 is performed next, if not then step 315 is performed next. The first predetermined threshold 210 may be a function of transmission gear 245, and engine torque 250.

In the alternative path, in step 320, the vehicle control unit calculates the rate of change of the ratio of the first speed signal 200 to the second speed signal 205. If the rate of change of ratio of the first speed signal 200 to the second speed signal 205 is greater than a second predetermined threshold 240, step 310 is performed next, if not then step 315 is performed next. The second predetermined threshold 240 may be a function of transmission gear 245. Note that in an alternative embodiment, the vehicle control unit may look at both the ratio of the first speed signal 200 to the second speed signal 205 and the rate of change of the ratio of the first speed signal 200 to the second speed signal 205.

In step 310, the vehicle control unit 140 commands the engine control unit 145 to enable at least the torque governor 225.

In step 315, the vehicle control unit 140 commands the engine control unit 145 to continue use of the speed governor 220.

Figure 4:
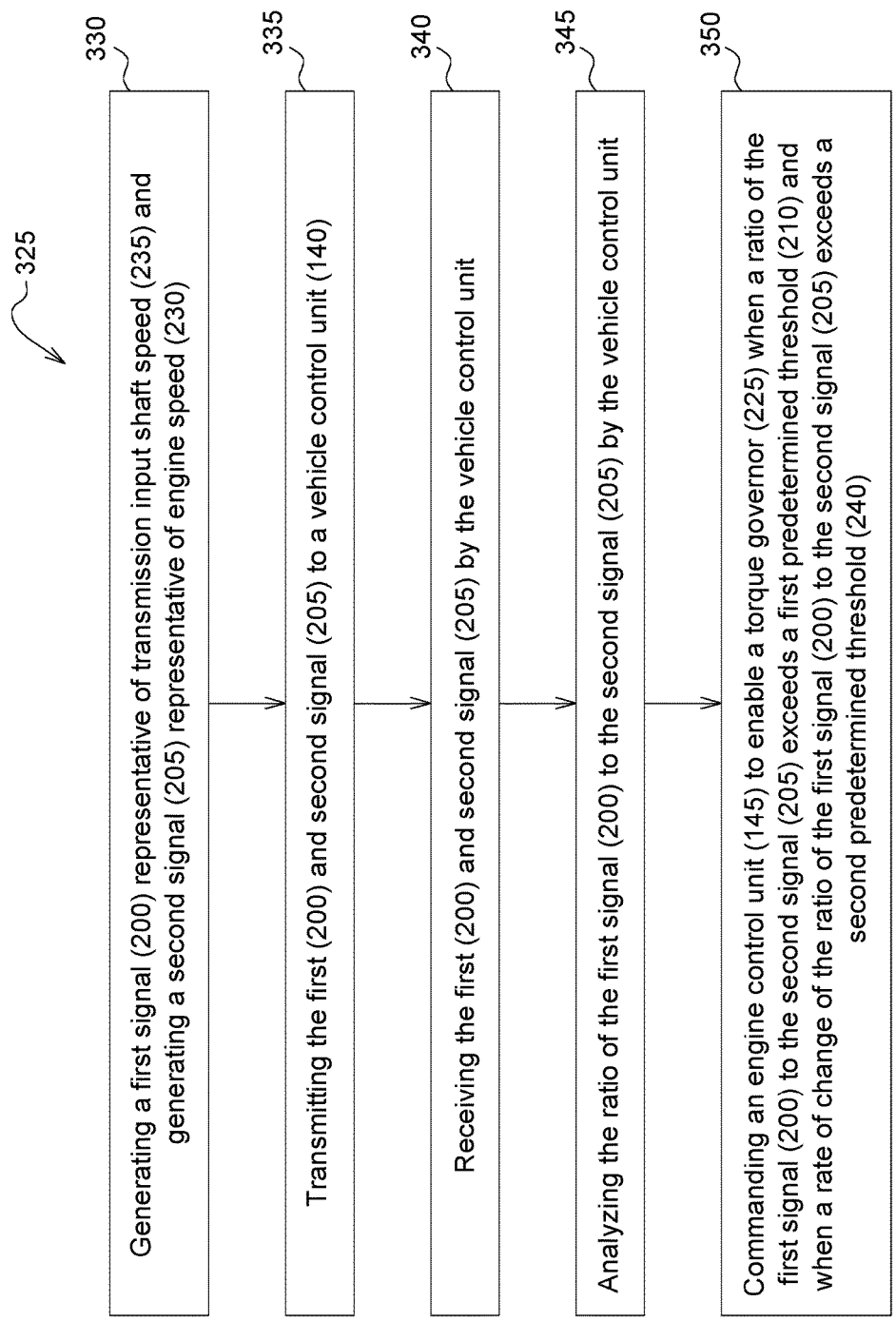
FIG. 4 is a flowchart of a method for improving the perceived ease of operation of a work vehicle with an internal combustion engine.

FIG. 4 is a flowchart of a method for improving the perceived ease of operation of a work vehicle with an internal combustion engine. The method comprises generating a first signal 200 representative of the transmission input shaft speed 235 and generating a second signal 205 representative of the engine speed 285; transmitting the first 200 and second signal 205 to a vehicle control unit 290; receiving the first 200 and second signal 205 by the vehicle control unit 295; analyzing the ratio of the first signal 200 to the second signal 205 by the vehicle control unit 300; and commanding an engine control unit 145 to enable a torque governor 225 when a ratio of the first signal 200 to the second signal 205 exceeds a first predetermined threshold 210, and when a rate of change of the ratio of the first signal 200 to the second signal 205 exceeds a second predetermined threshold 240 as shown in step 305.

The torque governor 225 of the method is configured to adjust an internal combustion engine torque when the torque governor 225 is in the enabled state. The speed governor 220 is configured to adjust an internal combustion engine speed 230 when the all speed governor is in an enabled state.

The method further comprises receiving a signal representative of boom speed 260, and inhibiting the torque convertor 185 from operating in the lockup mode when the boom speed signal 260 is above a calculated threshold 265.

The calculated threshold 265 is a function of the engine speed 230 as the engine speed increases. To clarify, the ability to inhibit the torque converter 185 from operating in lockup mode is effectively nullified at high engine speeds.

FIG. 5 is a graph demonstrating the improved ease of operation of a work vehicle 100 utilizing the system and method disclosed. The x-axis is time 355. The left hand y-axis is work vehicle velocity 360. The right hand y-axis is a percentage of maximum throttle position 365 or a pedal position which correlates to the engine speed, wherein an increased throttle position translates to an increased engine speed, and alternatively, where a decreased throttle position translates to a decreased engine speed. The top hand dotted curve is the percentage of maximum throttle position or engine speed correlating to pedal position over time 355. The second dotted curve demonstrates the corresponding velocity of the work vehicle when the operating parameters are functioning under a speed governor 220. The solid curve demonstrates the corresponding velocity of the work vehicle when the operating parameters are functioning under a torque governor 225. The transition in velocity of the work vehicle when the engine speed is increased or decreased is effectively dampened and hence improving the perceived ease of operation of a work vehicle with a reduced jolt.

The terminology used herein is for the purpose of describing particular embodiments or implementations and is not intended to be limiting of the disclosure. As used herein, the singular forms "a", "an" and "the" are intended to include the plural forms as well, unless the context clearly indicates otherwise. It will be further understood that the any use of the terms "has," "have," "having," "include," "includes," "including," "comprise," "comprises," "comprising," or the like, in this specification, identifies the presence of stated features, integers, steps, operations, elements, and/or components, but does not preclude the presence or addition of one or more other features, integers, steps, operations, elements, components, and/or groups thereof.

The references "A" and "B" used with reference numerals herein are merely for clarification when describing multiple implementations of an apparatus.

One or more of the steps or operations in any of the methods, processes, or systems discussed herein may be omitted, repeated, or re-ordered and are within the scope of the present disclosure.

While the above describes example embodiments of the present disclosure, these descriptions should not be viewed in a restrictive or limiting sense. Rather, there are several variations and modifications which may be made without departing from the scope of the appended claims.

What is claimed is:

1. A system for a work vehicle with an internal combustion engine, comprising:
 a torque converter coupled at one end to the internal combustion engine and at an opposite end to a transmission via at least a transmission input shaft,
 at least two governors coupled to the internal combustion engine, wherein the at least two governors are configured to adjust an operating parameter of the internal combustion engine; and
 a vehicle control unit communicatively coupled to the at least two governors wherein the vehicle control unit is configured to receive a first and second speed signal, and wherein the vehicle control unit commands an engine control unit to enable at least one of the governors when a ratio of the first speed signal to the second speed signal exceeds a first predetermined threshold, wherein the vehicle control unit commands the engine control unit to enable at least one of the governors when a rate of change of the ratio of the first speed signal to the second speed signal exceeds a second predetermined threshold.

2. The system of claim 1, wherein the first and second predetermined thresholds are a function of a transmission gear.

3. A system for a work vehicle with an internal combustion engine, comprising:
- a torque converter coupled at one end to the internal combustion engine and at an opposite end to a transmission via at least a transmission input shaft,
- at least two governors coupled to the internal combustion engine, wherein the at least two governors are configured to adjust an operating parameter of the internal combustion engine; and
- a vehicle control unit communicatively coupled to the at least two governors wherein the vehicle control unit is configured to receive a first and second speed signal, and wherein the vehicle control unit commands an engine control unit to enable at least one of the governors when a ratio of the first speed signal to the second speed signal exceeds a first predetermined threshold, wherein the vehicle control unit is further communicatively coupled to a boom wherein the vehicle control unit receives a signal representative of a boom speed and inhibits the torque converter from operating in a lockup mode when a boom speed signal is above a calculated threshold
- wherein the torque converter operates in the lockup mode when the torque converter couples the internal combustion engine directly to the transmission and otherwise operates in torque converter mode.

4. The system of claim 3, wherein the calculated threshold is a function of the internal combustion engine speed, and increases as the internal combustion engine speed increases.

5. A system for improving a perceived ease of operation in a work vehicle with an internal combustion engine, comprising:
- a torque converter coupled at one end to the internal combustion engine and at an opposite end to a transmission via at least a transmission input shaft;
- an all speed governor configured to adjust an internal combustion engine speed when the all speed governor is in an enabled state;
- a torque governor configured to adjust an internal combustion engine torque when the torque governor is in the enabled state; and
- a vehicle control unit communicatively coupled to the transmission input shaft and the internal combustion engine wherein the vehicle control unit receives a first speed signal representative of a transmission input shaft speed and a second speed signal representative of the internal combustion engine speed, and commands an engine control unit to enable the torque governor when a ratio of the first speed signal to the second speed signal exceeds a first predetermined threshold.

6. The system of claim 5, wherein the all speed governor is disabled when the torque governor is enabled.

7. The system of claim 5, wherein the vehicle control unit further commands the engine control unit to enable the torque governor when a rate of change of the ratio of the first speed signal to the second speed signal exceeds a second predetermined threshold.

8. The system of claim 7, wherein the first and second predetermined thresholds are a function of a transmission gear.

9. The system of claim 5, wherein the vehicle control unit is further communicatively coupled to a boom wherein the vehicle control unit receives a signal representative of the boom speed and inhibits the torque converter from operating in a lockup mode when a boom speed signal is above a calculated threshold wherein the torque converter operates in the lockup mode when the torque converter couples the engine directly to the transmission and otherwise operates in a torque converter mode.

10. The system of claim 9, wherein the calculated threshold is a function of the internal combustion engine speed and increases as the internal combustion engine speed increases.

11. The system of claim 5, wherein the vehicle control unit is communicatively coupled to an operator switch wherein the vehicle control unit receives a signal to inhibit the torque converter from operating in a lockup mode when the operator switch is activated,
- wherein the torque converter operates in the lockup mode when the torque converter couples the engine directly to the transmission and otherwise operates in a torque converter mode.

12. A method for a work vehicle with an internal combustion engine, the method comprising:
- generating a first signal representative of a transmission input shaft speed and generating a second signal representative of an internal combustion engine speed
- transmitting the first and second signal to a vehicle control unit
- receiving the first and second signal by the vehicle control unit
- analyzing a ratio of the first signal to the second signal by the vehicle control unit, and
- commanding an engine control unit to enable a torque governor when the ratio of the first signal to the second signal exceeds a first predetermined threshold, and when a rate of change of the ratio of the first signal to the second signal exceeds a second predetermined threshold.

13. The method of claim 12, wherein the torque governor is configured to adjust an internal combustion engine torque when the torque governor is in an enabled state; and
- an all speed governor configured to adjust the internal combustion engine speed when the all speed governor is in the enabled state.

14. The method of claim 12, further comprising:
- receiving a signal representative of boom speed, and
- inhibiting a torque converter from operating in a lockup mode when the boom speed signal is above a calculated threshold.

15. The method of claim 14, wherein the calculated threshold is a function of the internal combustion engine speed and increases as the internal combustion engine speed increases.

* * * * *